No. 870,955. PATENTED NOV. 12, 1907.
R. T. HAZZARD.
COMBINATION FORK AND RAKE.
APPLICATION FILED MAY 21, 1906.
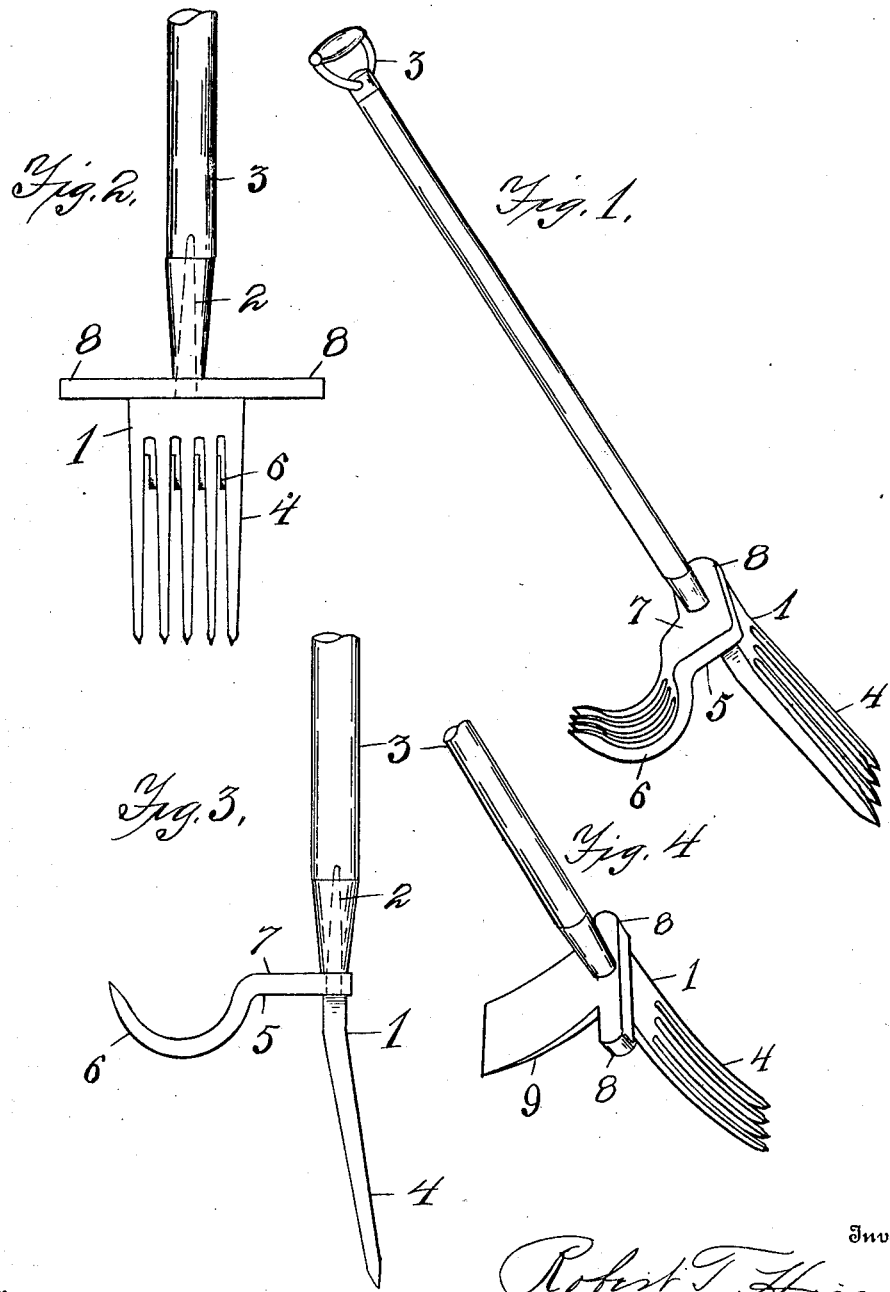

UNITED STATES PATENT OFFICE.

ROBERT T. HAZZARD, OF JAMESTOWN, NEW YORK.

COMBINATION FORK AND RAKE.

No. 870,955.  Specification of Letters Patent.  Patented Nov. 12, 1907.

Application filed May 21, 1906. Serial No. 317,894.

*To all whom it may concern:*

Be it known that I, ROBERT T. HAZZARD, a citizen of the United States, residing at Jamestown, in the county of Chautauqua, State of New York, have invented a new and useful Combination Fork and Rake, of which the following, taken in connection with the accompanying drawings, is a full, clear, and exact description.

The invention relates to improvements in digging tools; and the object of my improvement is to so combine a rake head or other digging implement with a digging fork that the added implement forms a fulcrum for the fork, and at the same time either of the tools may be used independently.

This combined tool, when made in small size, is specially adapted to pulling such weeds as dock, plantain, dandelion, and the like, from lawns; and when made in larger size forms a most convenient potato digger. The arrangement of the parts of the tool is substantially the same in the different sizes.

In the drawings, Figure 1 is a perspective view of the combination fork and rake. Fig. 2 is a plan view, and Fig. 3 is a side elevation of the tool. Fig. 4 is a perspective view of a modification of the tool.

Similar numerals refer to corresponding parts in the several views.

The numeral 1 indicates the fork head which is attached by a suitable tang 2 to a handle 3 in the usual manner.

The tines 4 of the fork are made sufficiently strong to withstand the leverage attained by a suitable length of handle in prying across a fulcrum. The fork tines 4 are separated to a greater or less degree according to the purpose desired and the number of tines used may also be regulated according to said purpose and not depart from my invention. For example, when used as a potato digger, the tines should be fairly wide apart, as is common in digging forks for such purposes. When used as a weeder the entire width of the fork should be about three to five inches and the tines should be correspondingly small and the space between them be diminished to correspond with the smaller implement.

A fulcrum is needed for either sized fork, and is preferably obtained by means of a rake head 5 which is attached to the handle 3 against the fork head 1. The teeth 6 of the rake preferably correspond in number and size to that of the fork tines 4 and are usually arranged in the same relation to one another. The rake head extends at about right angles to the fork head 1 and the teeth 6 are given a forward and rearward curve underneath the fork, whereby they come into convenient position to form a fulcrum for the fork. The curve of the rake teeth 6 is such that the fork rocks easily over the same as a fulcrum, yet said rake teeth are also in position for instant use as a rake when so desired.

On the narrow tool above described for use in weeding, the head of the rake is preferably given a projection 7 from the handle 3 before beginning teeth 6 sufficient to allow of pressure by the foot thereon in order to force the fork into the earth. The head 4 may also be projected to one or both sides as at 8 in order to form additional surface for foot pressure. Both or either of the extensions 7 or 8 may be used or either may be dispensed with according to the different styles of tools desired. The wide head of the fork in a potato digger usually gives sufficient extension for foot pressure. It is convenient, however, to have plenty of driving surface for foot pressure in forcing the fork into the earth and either of the extensions may be added to the potato digger when desired.

It is apparent that the fork 1 can be forced into the ground beside a weed or hill of potatoes by foot pressure; that downward pressure may then be imparted to the handle 3 by the hand; and that the rake 5 or implement underneath the fork will form a convenient fulcrum by means of which the leverage of the handle causes the fork to raise the weed or hill of potatoes with but comparatively slight muscular effort on the part of the operator. Should the fork fail to raise all the potatoes or weed roots, the loosened soil may be raked over with the rake teeth, thus expeditiously completing the job.

The modification shown in Fig. 4 substitutes a hoe for a rake to perform the office of fulcrum. It is obvious that while a hoe or other digging implement may not be as well adapted for the digging purposes as a rake, yet the hoe would serve a good purpose as a fulcrum for the fork.

I claim as new:—

1. A combination tool consisting of a digging fork, a rake attached to and extending at right angles from the under side of the fork head, and teeth on said rake having rearwardly curved lower ends to form a fulcrum for said fork, substantially as shown and for the purpose specified.

2. A combination tool consisting of a handle 3, a digging fork 1 on said handle, extensions 8 on the head of said fork, a rake 5 attached to the under side of said fork head at right angles thereto, and teeth 6 on said rake curved rearwardly at their lower ends to act as a fulcrum for said fork, substantially as and for the purpose specified.

In testimony whereof I have signed my name to this specification in the presence of two subscribing witnesses.

ROBERT T. HAZZARD.

Witnesses:
 A. W. KETTLE,
 I. A. ELLSWORTH.